G. W. & J. A. WEBB.
BELT FASTENER.
APPLICATION FILED SEPT. 11, 1916.
1,258,281.
Patented Mar. 5, 1918.
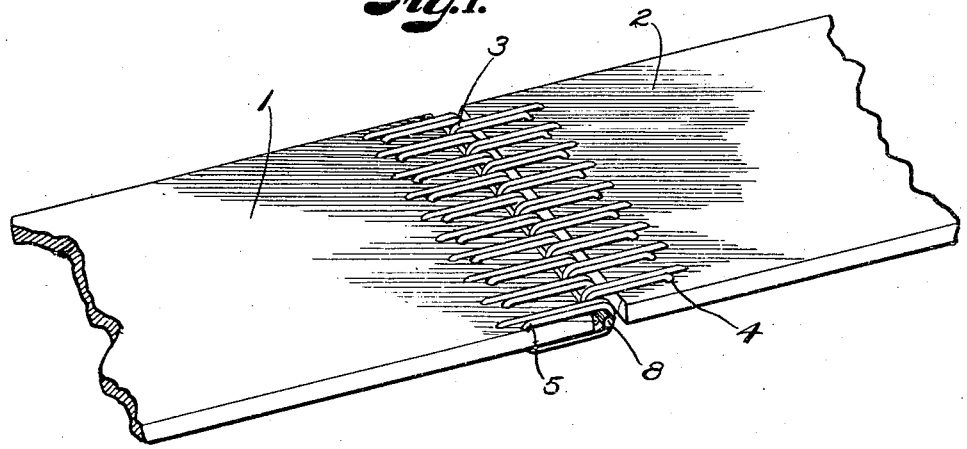
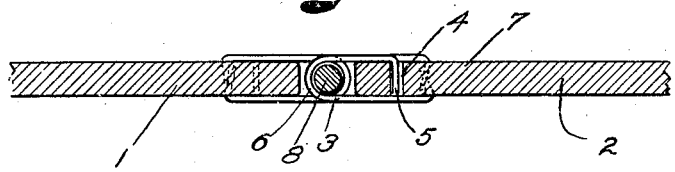
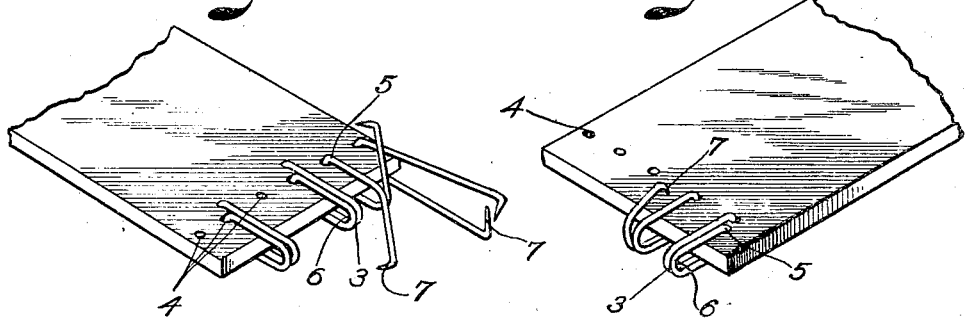
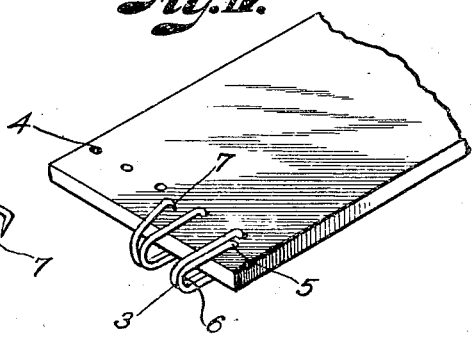
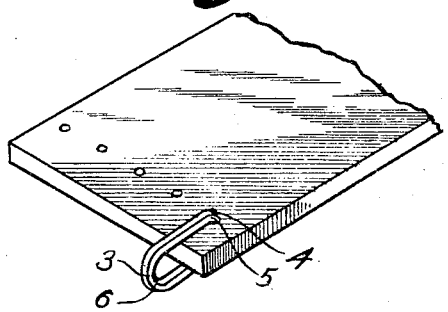
INVENTORS.
George W. Webb.
James A. Webb.
BY
ATTORNEY.

UNITED STATES PATENT OFFICE.

GEORGE W. WEBB AND JAMES A. WEBB, OF JOHNSON COUNTY, KANSAS, ASSIGNORS TO WEBB BROTHERS BELTING COMPANY, OF KANSAS CITY, MISSOURI, A CORPORATION OF MISSOURI.

BELT-FASTENER.

1,258,281. Specification of Letters Patent. Patented Mar. 5, 1918.

Application filed September 11, 1916. Serial No. 119,432.

*To all whom it may concern:*

Be it known that we, GEORGE W. WEBB and JAMES A. WEBB, citizens of the United States, residing in the county of Johnson and State of Kansas, have invented certain new and useful Improvements in Belt-Fasteners; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to belt fasteners and more particularly to means for connecting the ends of belts of transmission, elevating or conveying types, so that an endless band may be formed, the principal object of the invention being to provide fastening devices, which may be quickly and easily applied and will so connect the ends of a belt as to obviate any excessive protuberances of the connection and avoid weakening of the belt at the joint.

In accomplishing this object we have provided improved details of structure, the preferred forms of which are illustrated in the accompanying drawings, wherein:—

Figure I is a perspective view showing the ends of a belt connected by fastening devices constructed according to our invention.

Fig. II is an enlarged longitudinal section through the belt showing fasteners in place.

Fig. III is a detail perspective view of one end of a belt showing the manner of inserting and bending the fasteners.

Fig. IV is a similar view of a fastener wherein the points of the back lapped portions are inserted into the body of the belt between the end of the belt and the line of perforations.

Fig. V is a similar view showing the pointed ends of the connecting devices inserted in the belt perforations adjacent the loop portions.

Referring more in detail to the drawings:—

1 and 2 designate ends of a belt of ordinary leather or canvas construction, which are brought together and connected to form an endless transmission band.

Located at the ends of the belt are fastening devices embodying our invention, comprising links 3 formed from single strands of suitable wire, which are projected through alining apertures 4 adjacent the belt ends. Each of the link strands is bent upon itself to form a body loop 5, which seats in a perforation 4, and the ends of the strands are extended forwardly slightly past the belt end and turned back to form double registering loops 6 and to overlie opposite sides of the belt, the free ends of the strands being preferably extended back of the line of apertures and provided with inturned points 7 which are projected into the body of the belt to anchor the devices thereto.

A number of the fastening devices are located at each end of the belt, with the loops 6 projecting from the ends of the belt and in registration with each other, so that a pin 8 may be projected therethrough, the fasteners at each end of the belt being spaced, so that they may mesh with those at the opposite end of the belt and register therewith to receive the pin 8 that hingedly connects the fasteners and joins the ends of the belt.

In using the fastening devices, the belt is cut to the desired length and the free ends preferably perforated to receive the fastener wires. The wires, cut to the desired length with the ends pointed are projected through the belt, through the perforations when such are provided. The ends of the wires are then extended forwardly and bent back, preferably over a form (not shown), to overlie faces of the belt opposite those from which they originally project, to form the double loop at the outer end of the fastener. The points at the free ends of the strands are then preferably bent rearwardly to form hooks and pressed into the belt to anchor the free ends of the fasteners. When the perforations are formed in the belt otherwise than by forcing the fastener wires therethrough, care is taken to properly space the perforations in the belt ends, so that the fasteners, when placed, will register with each other and be separated a sufficient distance to mesh with fasteners on the opposite end of the belt.

When both ends of the belt have been equipped with the fasteners, the ends are brought together, so that the outer loops register and a pin 8, preferably of buckskin or other very tough material, is projected through the registering loops to form a hinged connection between the ends of the belt.

While we have described the fastener as having the end points projected into the belt body back of the line of perforations, we do not wish to limit the device to this particular form, as in some cases the points may be projected into the belt perforations along the inner loop parts, as shown in Fig. V, or the ends may be turned in and projected into the belt forwardly of the perforations, as shown in Fig. IV.

It is apparent that devices of this character may be used in belts of one or more plies, and that in addition to forming a convenient and serviceable belt connection, our improvement also provides a connection which does not detract from the strength of the belt.

Having thus described our invention what we claim as new therein and desire to secure by Letters-Patent, is:—

1. A belt fastener comprising a single piece of wire projected through one end of a belt and bent at intermediate points, with the base of the band seated in the belt, opposite strands of the wire being bent back at points spaced from the end of the belt to form a double loop for connection with like loops of coöperating fasteners.

2. A belt fastener comprising a single piece of wire projected through one end of a belt and bent at an intermediate point, with the base of the bend seated in the belt, opposite strands of the wire being bent back at points spaced from the edge of the belt to form a double loop for connection with like loops of coöperating fasteners and with the back turned ends of said strands attached to the belt to anchor the connecting loops.

3. A belt fastener comprising separate members for abutting ends of a belt, each member comprising a single piece of wire having a central part seated in one end of the belt and body portions extended beyond the end thereof, said body portions being bent back to form registering loops and having free ends overlying opposite sides of the belt, the free ends having inturned points projected into the belt material to form anchors separate from the intermediate part of the fastener, the registering loops of the fastening member at one end of the belt lying along corresponding loops of the member on the other end of the belt and a hinge pin projecting through the loops of both members, substantially as set forth.

4. A staple for belt fasteners having an intermediate belt embracing fold and having its legs bent upon themselves to provide intermediate pintle embracing loops and with the free ends of said legs positioned to impale the same end of the belt that is embraced by the fold of the staple thereby providing a four strand connection in each staple.

In testimony whereof we affix our signatures.

GEORGE W. WEBB.
JAMES A. WEBB.